US010644300B2

(12) United States Patent
Xing et al.

(10) Patent No.: US 10,644,300 B2
(45) Date of Patent: May 5, 2020

(54) POWER BATTERY TOP CAP STRUCTURE AND POWER BATTERY

(71) Applicant: Contemporary Amperex Technology Co., Limited, Ningde, Fujian (CN)

(72) Inventors: Chengyou Xing, Ningde (CN); Yulian Zheng, Ningde (CN); Peng Wang, Ningde (CN); Jian Guo, Ningde (CN); Zhijun Guo, Ningde (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 248 days.

(21) Appl. No.: 15/813,865

(22) Filed: Nov. 15, 2017

(65) Prior Publication Data

US 2018/0166676 A1 Jun. 14, 2018

(30) Foreign Application Priority Data

Dec. 12, 2016 (CN) .......................... 2016 1 1139420

(51) Int. Cl.
*H01M 2/34* (2006.01)
*H01M 2/08* (2006.01)
(Continued)

(52) U.S. Cl.
CPC ........... *H01M 2/345* (2013.01); *H01M 2/043* (2013.01); *H01M 2/08* (2013.01); *H01M 2/1077* (2013.01);
(Continued)

(58) Field of Classification Search
CPC ........ H01M 2/345; H01M 2/043; H01M 2/08; H01M 2/305; H01M 2200/20; H01M 2200/10
(Continued)

(56) References Cited

U.S. PATENT DOCUMENTS

2014/0017539 A1* 1/2014 Gibellini ............... H01M 2/043
429/99
2016/0336574 A1 11/2016 Guen et al.

FOREIGN PATENT DOCUMENTS

EP 2728642 A1 5/2014

OTHER PUBLICATIONS

Communication pursuant to Article 94(3) EPC issued in corresponding European patent application No. 17275184 dated May 22, 2019.
(Continued)

*Primary Examiner* — Eli S Mekhlin
*Assistant Examiner* — Kourtney R S Carlson
(74) *Attorney, Agent, or Firm* — Arent Fox LLP (57) ABSTRACT

A power battery and a power battery top cap structure for a power battery are provided. The power battery top cap structure includes first and second electrode assemblies, a lower insulation member, a top cap piece, and an abutment member. Both the first and second electrode assemblies are fixed on the top cap piece. The lower insulation member is fixed below the top cap piece. The lower insulation member includes, along an X axis, a snapping portion and a connecting portion. The abutment member extends along a Y axis and abuts between the connecting portion and the top cap piece so that a minimum distance between the connecting portion and the top cap piece along the Z axis is G3, where G3>0. G3 may be greater than a minimum distance between the connecting portion and the top cap piece when the lower insulation member is fixed without the abutment member.

19 Claims, 3 Drawing Sheets

(51) Int. Cl.
    *H01M 2/04*          (2006.01)
    *H01M 2/30*          (2006.01)
    *H01M 2/10*          (2006.01)
    *H01M 2/20*          (2006.01)
    *H01M 2/12*          (2006.01)

(52) U.S. Cl.
    CPC ....... *H01M 2/1241* (2013.01); *H01M 2/1252* (2013.01); *H01M 2/20* (2013.01); *H01M 2/305* (2013.01); *H01M 2200/20* (2013.01); *H01M 2220/10* (2013.01); *H01M 2220/20* (2013.01)

(58) Field of Classification Search
    USPC .......................................................... 429/61
    See application file for complete search history.

(56) References Cited

OTHER PUBLICATIONS

Extended European Search Report & Written Opinion issued in corresponding European Application No. 17275184 dated Apr. 3, 2018.

\* cited by examiner

POWER BATTERY TOP CAP STRUCTURE AND POWER BATTERY

CROSS-REFERENCE TO RELATED APPLICATION(S)

This application claims the benefit of Chinese Patent Application No. CN201611139420, entitled "POWER BATTERY TOP CAP STRUCTURE AND POWER BATTERY" and filed on Dec. 12, 2016 in the State Intellectual Property Office of the People's Republic of China (PRC) (SIPO), the disclosure of which is expressly incorporated by reference herein in its entirety.

BACKGROUND

Field

The present application relates to the technical field of energy storage devices, and particularly related to a power battery top cap structure and a power battery.

Background

At present, due to the fact that the lithium ion battery has the advantages including high energy density, high power density, large number of cycles, long storage time and so on, the lithium ion battery has been widely used in mobile phones, digital cameras, laptop computers and many other portable electronic devices. In addition, lithium ion batteries also exhibit great potential for applications in many large- and medium-sized electric devices, such as electric vehicles, electric bicycles and other types of electric vehicles and energy storage facilities. As a result, lithium ion batteries play a key role in solving many global issues, such as the energy crisis, environmental contamination and so on.

Electric vehicle technology has many appealing features. Electric cars and hybrid cars are closer than ever to be a regular part of people's everyday life. Accordingly, there is a huge business opportunity in the technical field of electric cars. At the same time, electric cars have increasingly high requirements for the capacity and safety of lithium ion batteries that provide energy for the electric cars. As a result, the effective space in a battery needs to be increased, and meanwhile, the insulation function between battery positive and negative electrodes needs to be ensured as well, so as to prevent the risk of short circuit from occurring in a battery.

SUMMARY

The present application provides a power battery top cap structure and a power battery.

A first aspect of the present application provides a power battery top cap structure. The top cap structure includes a first electrode assembly, a second electrode assembly, a lower insulation member, a top cap piece, and an abutment member. The length, width, and thickness of the top cap piece and of the lower insulation member extend in an X axis (a first direction or an X direction), a Y axis (a second direction or a Y direction), and a Z axis (a third direction or a Z direction), respectively, which are perpendicular/orthogonal to each other within a three-dimensional Cartesian coordinate system. Both the first electrode assembly and the second electrode assembly are fixed on the top cap piece. The lower insulation member is fixed below the top cap piece by a snap fit, and the lower insulation member includes, along the X axis, a snapping portion arranged on each of the two ends thereof, and a connecting portion arranged between the two snapping portions. The abutment member extends along a Y axis and abuts between the connecting portion and the top cap piece. A minimum distance between the connecting portion and the top cap piece along the Z axis is G3. In one configuration, G3>G1, where G1 is a minimum distance between the connecting portion and the top cap piece along the Z axis when the lower insulation member is fixed by the snap fit below the top cap piece and to the top cap piece without the abutment member and G3>0.5 mm.

Preferably, a natural size of the abutment member along the Z axis is G2, where 0.5 mm<G2<30 mm. G3 may be approximately equal to G2. Preferably, a first explosion-proof through hole is provided in a central portion of the connecting portion, and the abutment member constitutes an explosion-proof channel towards the first explosion-proof through hole along the X axis. Preferably, the top cap structure further includes an assistant abutment member, and the assistant abutment member is arranged surrounding the first explosion-proof through hole and abuts between the connecting portion and the top cap piece. A first ventilation gap is provided on the assistant abutment member. Preferably, the assistant abutment member is integrated with at least one of the top cap piece or the lower insulation member. Preferably, when the abutment member abuts between the connecting portion and the top cap piece, the lower insulation member forms an arch structure towards a direction away from the top cap piece along the Z axis. Preferably, the abutment member is integrated with at least one of the top cap piece or the lower insulation member. Preferably, the first electrode assembly includes a first electrode column and a first electrode column seal ring, and the second electrode assembly includes a second electrode column and a second electrode column seal ring. Both the first electrode column and the second electrode column pass through the top cap piece along the Z axis. The first electrode column is fixed on the top cap piece in a sealed and insulation manner via the first electrode column seal ring, and the second electrode column is fixed on the top cap piece in a sealed and insulation manner via the second electrode column seal ring. For the two snapping portions, one of the snapping portions snap fits with the first electrode column seal ring, and the other snapping portions snap fits with the second electrode column seal ring.

Preferably, the top cap structure further includes a first switching piece, a second switching piece, and an insulation end plate. The insulation end plate is fixed below the lower insulation member. Both the first switching piece and the second switching piece are arranged between the insulation end plate and the lower insulation member. Each of the snapping portions of the lower insulation member is provided with an avoidance hole. The first electrode column is connected with the first switching piece through the lower insulation member via one avoidance hole, and the second electrode column is connected with the second switching piece through the lower insulation member via another avoidance hole.

Preferably, the insulation end plate includes a first receiving chamber and a second receiving chamber respectively provided on two ends of the insulation end plate along the X axis. Electrode lug avoidance grooves are provided on side portions of the insulation end plate along the X axis. Each of the first receiving chamber and the second receiving chamber has a top opening and forms a channel with the electrode lug avoidance grooves. The avoidance holes of the lower insulation member are opposite the first receiving chamber and the second receiving chamber. The avoidance holes and the electrode lug avoidance grooves are arranged in a staggered fashion along the X axis. The first switching piece is disposed in the first receiving chamber, and the second switching piece is disposed in the second receiving chamber. Preferably, the top cap structure further includes an electrode lug stop portion. A second explosion-proof through hole is provided in a central portion of the insulation end plate. Each of the first receiving chamber and the second receiving chamber has an opening structure on a side facing the second explosion-proof through hole. The electrode lug stop portion is disposed between the lower insulation member and the insulation end plate to surround the second explosion-proof through hole. Preferably, a second ventilation gap is provided on the electrode lug stop portion. Preferably, the electrode lug stop portion is integrated with the insulation end plate.

A second aspect of the present application provides a power battery, which includes a battery core and the power battery top cap structure set forth above. The battery core is connected to the power battery top cap structure.

The technical solution provided in the embodiments of the present application is able to achieve the following advantageous effects: The power battery top cap structure for a power battery provided in the embodiments of the present application is able to stretch the space between the connecting portion and the top cap piece, resulting in a tighter snap fitting of the lower insulation member. In this way, the power battery/power battery top cap structure is able to effectively prevent the lower insulation member from making a small vertical displacement.

It is to be understood that both the foregoing general description and the following detailed description are for descriptive purposes only, and are not intended to limit the scope of the present application.

Description of element symbols: 1—shell; 2—bare battery core; 2a—positive electrode lug; 2b—negative electrode lug; 10—first electrode column; 11—first electrode column seal ring; 12—first switching piece; 20—second electrode column; 21—second electrode column seal ring; 22—second switching piece; 30—lower insulation member; 30a—first snapping portion; 30b—second snapping portion; 30c—connecting portion; 30d—first avoidance hole; 30e—second avoidance hole; 30f—first explosion-proof through hole; 40—top cap piece; 40a—explosion-proof valve; 50—abutment member; 50a—explosion-proof channel; 60—insulation end plate; 60a—first receiving chamber; 60b—second receiving chamber; 60c—electrode lug avoidance groove; 60d—second explosion-proof through hole; 70—assistant abutment member; 70a—first ventilation gap; 80—electrode lug stop portion; 80a—second ventilation gap.

The drawings as described above are incorporated into the Detailed Description to constitute a part of the Detailed Description of the present application. The drawings show the embodiments according to the present application, and are used along with the Detailed Description for describing the mechanism of the present application.

DETAILED DESCRIPTION

The present application will be further described in details in reference to specific exemplary embodiments and accompanying drawings. The terms "front," "rear," "left," "right," "top" and "low" are used in the present application with respective to the power battery top cap structure shown in the drawings of the present application.

In one embodiment, an insulation effect in a battery between its battery core and top cap piece may be achieved by way of a lower insulation member. The lower insulation member may be fixed below the top cap piece in a snap fitting manner. After the two pieces of snap fitting structure are engaged together, a gap is formed in the direction of the thickness of the top cap piece. Accordingly, the lower insulation member may have a small displacement within such small space, in particular a vertical displacement. As a result, the lower insulation member may fall off when a power battery shakes. The displaced lower insulation member may lead to a direct contact between the battery core and the top cap piece, which may cause a short circuit accident. Embodiments are provided infra that may avoid such a displacement with the lower insulation member.

Figure 1:
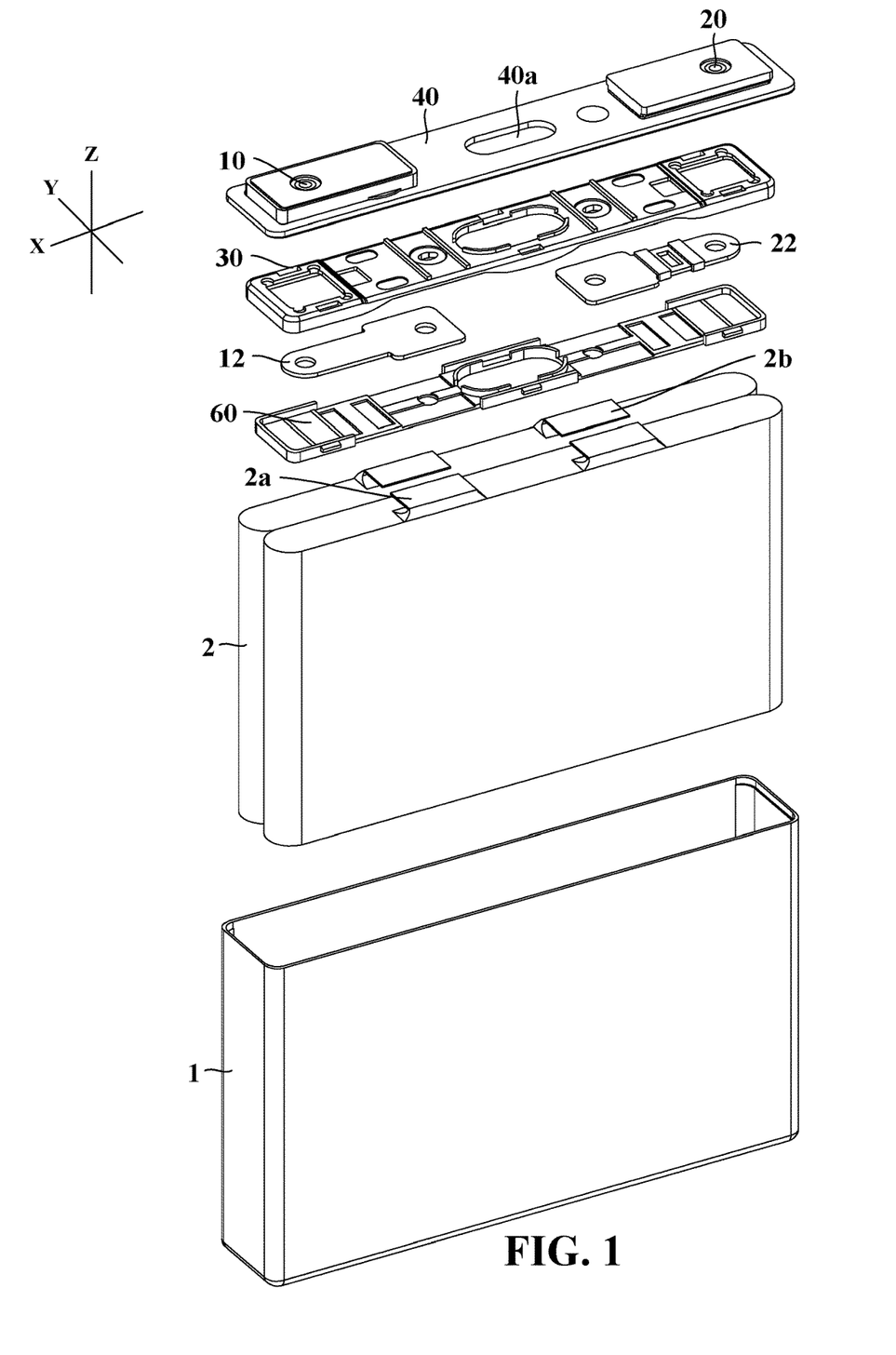
FIG. 1 is a schematic exploded view of the power battery provided in the embodiments of the present application.

As shown in FIG. 1, first, in this embodiment of the present application, an X axis, a Y axis and a Z axis, which are perpendicular to each other, have been defined within a three-dimensional Cartesian coordinate system. The embodiment of the present application provides a power battery, which includes a shell 1, a bare battery core 2, and a power battery top cap structure. The power battery top cap structure includes a first electrode assembly and a second electrode assembly, in which the first electrode assembly includes a first electrode column 10, a first electrode column seal ring 11 (see FIG. 4), and a first switching piece 12; and the second electrode assembly includes a second electrode column 20, a second electrode column seal ring 21 (see FIG. 4), and a second switching piece 22. Moreover, the foregoing power battery top cap structure further includes a lower insulation member 30, a top cap piece 40, an abutment member 50 (shown in FIG. 3), and an insulation end plate 60. A direction of the lengths of the top cap piece 40 and the lower insulation member 30 is the X axis, a direction of widths thereof is the Y axis, and a direction of thickness thereof is the Z axis.

Both the first electrode column 10 and the second electrode column 20 protrude through the top cap piece 40 along the Z axis. In addition, the first electrode column 10 is affixed on the top cap piece 40 in a sealed and insulation manner via the first electrode column seal ring 11, and the second electrode column 20 is affixed on the top cap piece 40 in a sealed and insulation manner via the second electrode column seal ring 21.

The first switching piece 12 and the second switching piece 22 are respectively connected to a positive electrode lug 2a and a negative electrode lug 2b of the bare battery core 2. As shown in FIG. 1, the first switching piece 12 is connected to the positive electrode lug 2a, and the second switching piece 22 is connected to the negative electrode lug 2b. However, of course the first switching piece 12 may be connected to the negative electrode lug 2b, and the second switching piece 22 may be connected to the positive electrode lug 2a.

Figure 2:
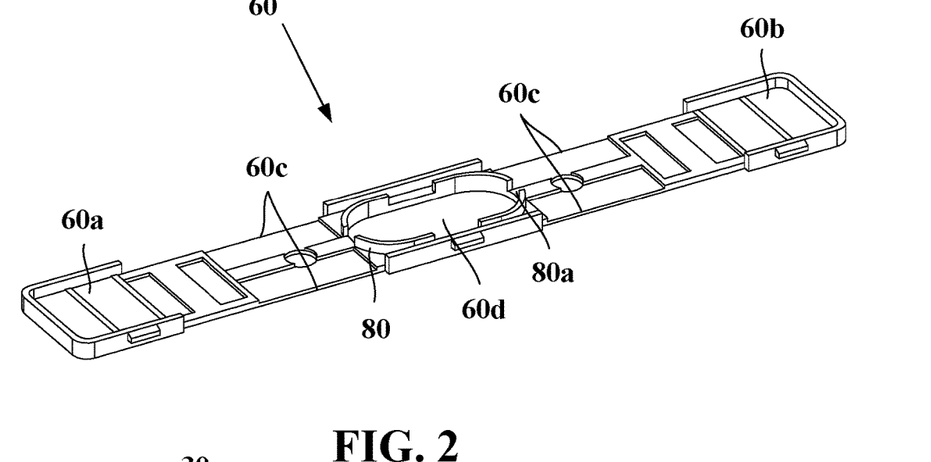
FIG. 2 is a schematic view of the structure of the insulation end plate provided in the embodiments of the present application.

As shown in FIG. 2, a first receiving chamber 60a and a second receiving chamber 60b are respectively provided on two ends of the insulation end plate 60 along the X axis. Each of the first receiving chamber 60a and the second receiving chamber 60b has a top opening. The first switching piece 12 is disposed in the first receiving chamber 60a, and the second switching piece 22 is disposed in the second receiving chamber 60b. In addition, a plurality of electrode lug avoidance grooves 60c is provided on side portions along the X axis of the insulation end plate 60. Some of the plurality of electrode lug avoidance grooves 60c form a channel with the first receiving chamber 60a, and some of the plurality of electrode lug avoidance grooves 60c form a channel with the second receiving chamber 60b. These channels allow the electrode lugs 2a, 2b to pass through. Moreover, the folded electrode lugs 2a, 2b are respectively welded to the surfaces facing away from the insulation end plate 60 of the first switching piece 12 and the second switching piece 22.

The lower insulation member 30, the side portions of the first switching piece 12 and the second switching piece 22 away from the insulation end plate 60, and the insulation end plate 60 are snapped together. In this way, the first switching piece 12 and the second switching piece 22 are sealed between the lower insulation member 30 and the insulation end plate 60. Such an assembly protects the first switching piece 12 and the second switching piece 22, and prevents the first switching piece 12 and the second switching piece 22 from forming a short circuit with the bare battery core 2.

Figure 3:
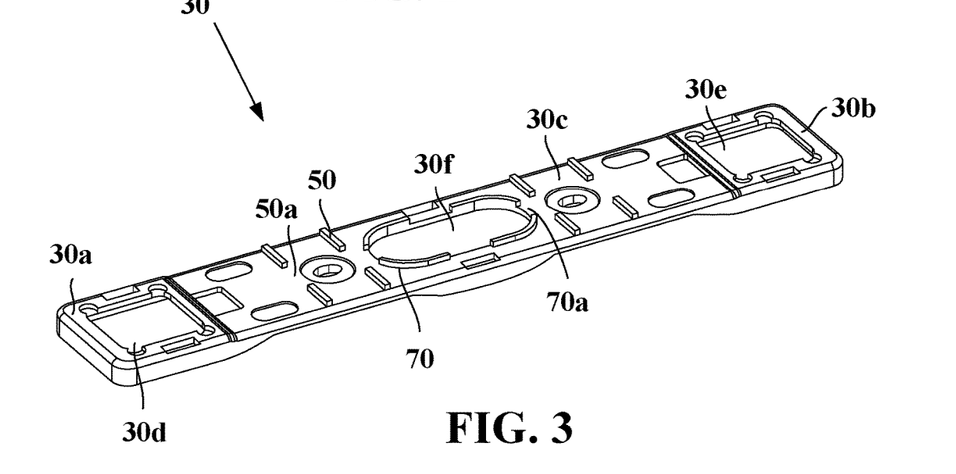
FIG. 3 is a top view of the structure of the lower insulation member integrated with an abutment member provided in the embodiments of the present application.

As shown in FIG. 3, the lower insulation member 30 includes a first snapping portion 30a and a second snapping portion 30b at the two ends thereof along the X axis, and a connecting portion 30c arranged between the first snapping portion 30a and the second snapping portion 30b. Abutment members 50 are located on the connecting portion 30c with a thickness in the Z direction (Z axis). The connecting portion 30c extends in the X direction (X axis) and the abutment members 50 extend in the Y direction (Y axis), which is orthogonal to the X and Z directions. In addition, a first avoidance hole 30d is provided on the first snapping portion 30a, and a second avoidance hole 30e is provided on the second snapping portion 30b. When the lower insulation member 30 is snapped together with the insulation end plate 60, the first avoidance hole 30d is facing the first receiving chamber 60a, and the second avoidance hole 30e is facing the second receiving chamber 60b. At the same time, the first avoidance hole 30d, the second avoidance hole 30e, and the electrode lug avoidance grooves 60c are staggered with each other in an arrangement along the X axis. The first avoidance hole 30d is provided to allow the first electrode column 10 to pass through, and the second avoidance hole 30e is provided to allow the second electrode column 20 to pass through. Moreover, the first switching piece 12 is electrically connected to a lower surface of the first electrode column 10, and the second switching piece 22 is electrically connected to a lower surface of the second electrode column 20.

After finishing the foregoing connections, the first electrode column 10 passes through the first snapping portion 30a and protrudes from a lower surface of the first snapping portion 30a; in addition, the second electrode column 20 passes through the second snapping portion 30b and protrudes from a lower surface of the second snapping portion 30b. In this way, there will be a gap between the upper surfaces of the first switching piece 12 and second switching piece 22 and the lower surface of the lower insulation member 30. Accordingly, the contact between the positive electrode lug 2a and the first switching piece 12, and the contact between the negative electrode lug 2b and the second switching piece 22, will be located within the gap, thereby maximizing the use of the gap, and thus improving energy density of the power battery.

The lower insulation member 30 may be directly affixed to the top cap piece 40 in a snap fitting manner. The lower insulation member 30 may thus be fixed with the top cap piece 40 directly, or may be fixed from a snap fitting between the first snapping portion 30a and the first electrode column seal ring 11, as well as a snap fitting between the second snapping portion 30b and the second electrode column seal ring 21.

The snap fitting manner employed above is achieved through an engagement between a snap inserting element and a snap receiving element, in which the snap inserting element may be a claw, a hook, or the like, while the snap receiving element may be a hole, a slot, a groove, or the like. It should be noted that the specific positions of the snap inserting element and the snap receiving element can be switched with each other. For example, a slot, hole, or groove may be provided on the first snapping portion 30a and the second snapping portion 30b of the lower insulation member 30, and a corresponding claw or hook may be provided on the first electrode column seal ring 11 and the second electrode column seal ring 21. Conversely, a claw or hook may be provided on the first snapping portion 30a and the second snapping portion 30b of the lower insulation member 30, and a corresponding a slot, hole, or groove may be provided on the first electrode column seal ring 11 and the second electrode column seal ring 21.

Figure 4:
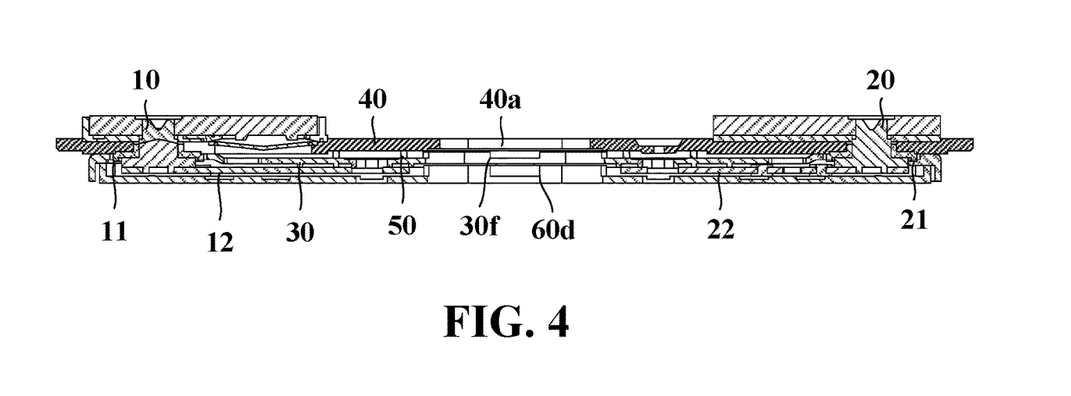
FIG. 4 is a schematic sectional side view of a power battery top cap structure that contains the lower insulation member shown in FIG. 3.
Figure 5:
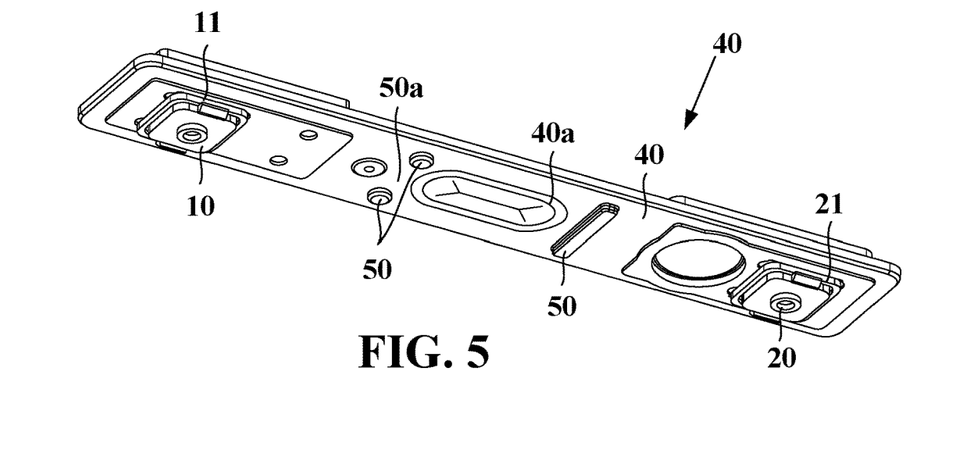
FIG. 5 is a schematic bottom view of the structure of the top cap piece integrated with an abutment member provided in the embodiments of the present application.
Figure 6:
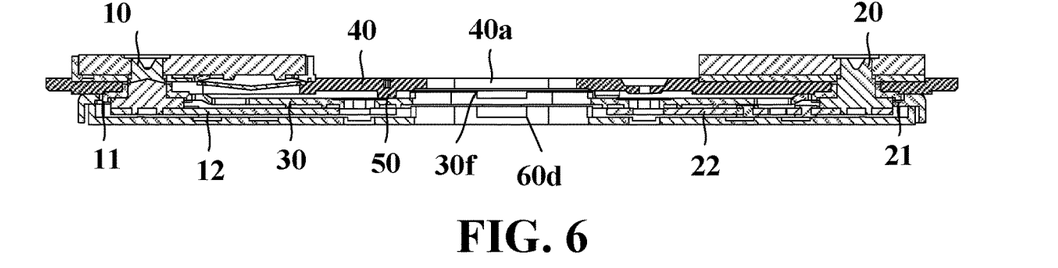
FIG. 6 is a schematic sectional side view of a power battery top cap structure that contains the top cap piece shown in FIG. 5.

As shown in FIGS. 4 to 6, an explosion-proof valve 40a is provided in the central part of the top cap piece 40; and at the same time, a first explosion-proof through hole 30f (see also FIG. 3) and a second explosion-proof through hole 60d are provided in the positions corresponding to the explosion-proof valve 40a on the lower insulation member 30 and the insulation end plate 60, respectively.

Figure 7:
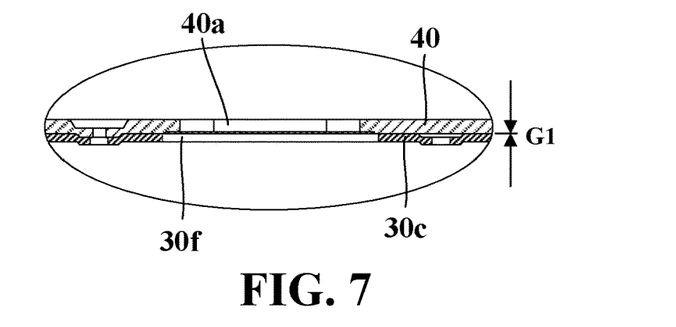
FIG. 7 is a schematic partial view of the fitting relation between the connecting portion and the top cap piece when the lower insulation member is fixed below the top cap piece via a snap fitting manner without using an abutment member.

An insulation effect between the bare battery core 2 and the top cap piece 40 may be achieved by the lower insulation member 30. As shown in FIG. 7, when the lower insulation member 30 is in its natural state (i.e., no abutment member 50 is provided between the connecting portion 30c and the top cap piece 40), the lower insulation member 30 is fixed below the top cap piece 40 via a snap fitting connection. In such a case, a minimum distance between the connecting portion 30c and the top cap piece 40 along the Z axis is G1. Typically, G1 is not very large. For the purpose of saving space within a power battery, it is desirable that G1 is 0 (as shown in FIG. 7); that is to say, the connecting portion 30c and the top cap piece 40 are attached to each other.

However, due to the fact that most types of insulation materials have a certain level of flexibility, even if the connecting portion 30c and the top cap piece 40 are attached to each other, the first snapping portion 30a and the second snapping portion 30b may still be able to move towards the top cap piece 40 through flexible deformation thereof. Such movements may loosen the snap fitting connection mentioned above. As a result, a gap may be formed in a direction of the thickness of the top cap piece 40. Such a gap will allow a certain level of vertical displacement of the lower insulation member 30. When the battery experiences excessive shaking, the lower insulation member 30 may become loose and separated from the top cap piece 40, leading to direct contact between the bare battery core 2 and the top cap piece 40 and causing a short circuit of the battery. Embodiments are provided infra that may avoid such a displacement with the lower insulation member 30.

Figure 8:
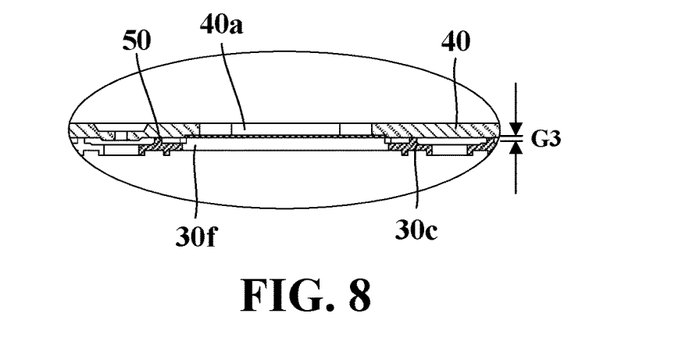
FIG. 8 is a schematic partial view of the fitting relation between the connecting portion and the top cap piece provided in the embodiments of the present application when the abutment member abuts between the connecting portion and the top cap piece.

In order to avoid the foregoing issue, an abutment member 50 is used. The abutment member 50 extends along the Y axis. A natural size (thickness) of the abutment member 50 along the Z axis is G2. As shown in FIG. 8, the abutment member 50 abuts between the connecting portion 30c and the top cap piece 40. In this way, the abutment member 50 is held tightly by the connecting portion 30c and the top cap piece 40. At the same time, the abutment member 50 will apply a strong supporting force to the connecting portion 30c, so as to push the connecting portion 30c away from the top cap piece 40. In such a case, the distance between the connecting portion 30c and the top cap piece 40 along the Z axis is G3, and G3>G1. Due to the supporting force mentioned above, the lower insulation member 30 will no longer move towards the top cap piece 40. The lower insulation member 30 may even form an arch structure or flex in a direction away from the top cap piece 40 along the Z axis, so as to stabilize the structure of lower insulation member 30 and to prevent the first snapping portion 30a and the second snapping portion 30b from moving towards the top cap piece 40 through flexible deformation of the lower insulation member 30. As a result, the snap fitting connection structure will be always in a tightly stretched state, which helps to effectively prevent loosening and separation of the snap fitting connection.

Taking into consideration factors such as the internal space within a power battery and the flexible deformation of the lower insulation member 30, G2 is desirable to be within the range of from 0.5 mm to 30 mm.

The abutment member 50 may be an independent part. However, when it is an independent part, there may be certain difficulties in the assembly process for adjusting its orientation and position. This may result in low assembly efficiency, and hence is not recommended. Thus, the abutment member 50 is desired to be provided as an integrated part. More specifically, the abutment member 50 may be integrated with the lower insulation member 30 (please refer to FIGS. 3 and 4); alternatively, the abutment member 50 may be integrated with the top cap piece 40 (please refer to FIGS. 5 and 6), or it may be integrated with both the top cap piece 40 and the lower insulation member 30 in a staggered or a symmetrical manner. In this way, the integrated abutment member 50 can be assembled along with the top cap piece 40 or the lower insulation member 30 without requiring other steps, thus improving the assembly efficiency.

The top cap piece 40 is typically a metal part. Accordingly, a top cap piece 40 with the integrated abutment member 50 may be formed by way of stamping. The lower insulation member 30 is typically a plastic part, and may be formed by way of injection molding. The foregoing two production processes are common molding formations featuring simple operation and low production cost, and hence is suitable for large-scale industrial production.

Both the supporting force and the flexible deformation of the lower insulation member 30 may vary in the direction of X axis, while they may have substantially no change in the direction of Y axis. If the abutment member 50 is oriented to extend along the X axis, each part of the abutment member 50 will receive the same variation in the supporting force and the flexible deformation; that is to say, the force applied on the two ends of the abutment member is the largest, while in the central part the deformation is the largest, and hence the force is the smallest. As a result, when the abutment member 50 extends along the X axis, the unbalanced force applied on the abutment member may be a serious concern, and may even result in damage to the abutment member 50. On the other hand, when the abutment member 50 extends in the direction along Y axis, the foregoing issue can be essentially avoided.

The various abutment members 50 may be symmetrically arranged with respect to the central part of the connecting portion 30c along the X axis, i.e., the first explosion-proof through hole 30f. In this way, the abutment members 50 from two sides of the first explosion-proof through hole 30f will apply substantially the same supporting force to the lower insulation member 30, and the direction of the combined supporting forces from the various abutment members 50 is pointed away from the top cap piece 40. This combined force vector helps to prevent the lower insulation member 30 from displacing along the X axis. In addition, it is desirable that the various abutment members 50 are also symmetrically arranged with respect to the central part of the connecting portion 30c along the Y axis. Such a symmetrical arrangement helps to prevent the lower insulation member 30 from deflecting due to receiving unbalanced forces in the direction along the Y axis.

When the explosion-proof valve 40a is opened, a majority of the gas within the power battery will enter the explosion-proof valve 40a via the first explosion-proof through hole 30f. However, in the case where there is a gap between the top cap piece 40 and the lower insulation member 30, some of the gas may enter the explosion-proof valve 40a via the gap between the top cap piece 40 and the lower insulation member 30. However, the abutment member 50 that extends along the Y axis may block the gas flow along the X axis. In this regard, if the abutment member 50 extends along the Y axis from one side of the connecting portion 30c to the other side thereof, it may completely block the gas flowing along the X axis from entering the explosion-proof valve 40a. Such blockage will negatively affect the desired quick gas discharging function of the power battery.

In order to solve the problem mentioned above, it is desirable that the abutment member 50 is provided with an explosion-proof channel 50a towards the first explosion-proof through hole 30f along the X axis. The abutment member 50 may be in the form of abutment block or abutment strip, and a space along the Y axis is arranged between two neighboring abutment blocks or abutment strips (please refer to FIGS. 3 and 5), so as to form the explosion-proof channel 50a. For comparison, see FIG. 1 where the abutment members are illustrated without explosion-proof channels. As illustrated in FIG. 3, pairs of abutment members 50 are collinear with each other, with the explosion-proof channel 50a between abutment members 50 of each pair of collinear abutment members 50. However, the pairs of abutment members 50 need not be collinear.

Due to the presence of the first explosion-proof through hole 30*f*, the strength of the connecting portion 30*c* around the first explosion-proof through hole 30*f* may be reduced. In particular, when pressed by the switching pieces 12/22 or electrode lugs 2*a*/2*b* from below, the connecting portion 30*c* may undergo deformation and may bend upwards, which may damage the lower insulation member 30, or may result in the part of the connecting portion 30*c* around the first explosion-proof through hole 30*f* becoming attached to the top cap piece 40. As a result, the explosion-proof channel 50*a* may completely lose its function for discharging gas along the X axis and Y axis.

Therefore, an additional component, an assistant abutment member 70, is further provided in this embodiment of the present application. The assistant abutment member 70 is arranged to surround the first explosion-proof through hole 30*f* and abuts between the connecting portion 30*c* and the top cap piece 40. In addition, a first ventilation gap 70*a* is provided on the assistant abutment member 70. The assistant abutment member 70 functions to provide additional support for the regions around the first explosion-proof through hole 30*f*, so as to prevent those regions from undergoing a significant deformation or from even directly attaching to the top cap piece 40. Moreover, the first ventilation gap 70*a* ensures that the gas discharges through the explosion-proof channel 50*a* along the directions of both X axis and Y axis. The first ventilation gap 70*a* may be arranged along the X axis or the Y axis. In addition, similar to the abutment member 50 discussed above, the first ventilation gap 70*a* may be integrated with the top cap piece 40 or the lower insulation member 30 for the purpose of simplifying the assembly process. However, due to the fact that the explosion-proof valve 40*a* is to be integrated with the top cap piece 40, it may be difficult to further integrate the assistant abutment member 70 with the same top cap piece 40. Therefore, it is desirable that the assistant abutment member 70 is integrated with the lower insulation member 30.

In this embodiment, in order to facilitate assembly of the power battery, the first receiving chamber 60*a* and the second receiving chamber 60*b* of the insulation end plate 60 are not completely closed along the X axis. Rather, each of them has been designed to have an opening structure on the side facing the second explosion-proof through hole 60*d*. As such, both the positive electrode lug 2*a* and the negative electrode lug 2*b* may enter the first explosion-proof through hole 30*f* from below the first explosion-proof through hole 30*f*. As a result, the first explosion-proof through hole 30*f* may be blocked. In a more severe case, the positive electrode lug 2*a* and the negative electrode lug 2*b* may contact the explosion-proof valve 40*a* through the first explosion-proof through hole 30*f*. Such contact can result in a short circuit in the power battery.

Therefore, as shown in FIG. 2, an electrode lug stop portion 80 is further provided in this embodiment. The electrode lug stop portion 80 is arranged between the lower insulation member 30 and the insulation end plate 60 to surround the second explosion-proof through hole 60*d*. Using the electrode lug stop portion 80, the positive electrode lug 2*a* and the negative electrode lug 2*b* can be effectively prevented from entering below the first explosion-proof through hole 30*f*. Due to the need for gas discharge, similar to the assistant abutment member 70, a second ventilation gap 80*a* may be provided on the electrode lug stop portion 80. The second ventilation gap 80*a* can be arranged along the X axis, or along the Y axis. The electrode lug stop portion 80 may be integrated with the lower insulation member 30 or the insulation end plate 60. However, it may be more effective when integrated with the insulation end plate 60.

The power battery top cap structure provided in the embodiment of the present application is able to effectively prevent the lower insulation member from experiencing a small displacement. In addition, it also has the advantages of a simple operation, easy assembly, and low production cost, and so on.

Described above is an exemplary embodiment of the present application, and is not intended to limit the present application. To a person of ordinary skill in the art, the present application may have various changes and modifications. Any modification, replacement or improvement based on the present application shall be encompassed within the scope of the present application.

What is claimed is:

1. A power battery top cap structure, comprising:
   a top cap piece, a length, a width, and a thickness of the top cap piece extending on an X axis, a Y axis, and a Z axis, respectively, where the X axis, the Y axis, and the Z axis are perpendicular to each other;
   a first electrode assembly and a second electrode assembly fixed on the top cap piece, wherein the first electrode assembly comprises a first electrode column, and the second electrode assembly comprises a second electrode column;
   a lower insulation member fixed below the top cap piece by a snap fit, a length, a width, and a thickness of the lower insulation member extending on the X axis, the Y axis, and the Z axis, respectively, wherein the lower insulation member comprises, along the X axis, a snapping portion arranged on each of two ends thereof, and a connecting portion arranged between the two snapping portions;
   an abutment member extending along the Y axis and abutting between the connecting portion and the top cap piece, a minimum distance between the connecting portion and the top cap piece along the Z axis being G3, where G3>0; and
   a first switching piece, a second switching piece, and an insulation end plate, wherein the insulation end plate is fixed below the lower insulation member, both the first switching piece and the second switching piece are arranged between the insulation end plate and the lower insulation member, wherein each of the snapping portions comprises an avoidance hole, and wherein the first electrode column passes through one of the avoidance holes of the lower insulation member and is connected with the first switching piece, and the second electrode column passes through the other of the avoidance holes of the lower insulation member and is connected with the second switching piece.

2. The power battery top cap structure according to claim 1, wherein G3>0.5 mm.

3. The power battery top cap structure according to claim 1, wherein a thickness of the abutment member along the Z axis is G2, wherein 0.5 mm<G2<30 mm, and wherein G3 is approximately equal to G2.

4. The power battery top cap structure according to claim 1, wherein a first explosion-proof through hole is in a central portion of the connecting portion, and the abutment member includes an explosion-proof channel towards the first explosion-proof through hole along the X axis.

5. The power battery top cap structure according to claim 4, wherein the top cap structure further comprises an assistant abutment member, wherein the assistant abutment member is arranged to surround the first explosion-proof through hole and abuts between the connecting portion and the top cap piece, and a first ventilation gap is on the assistant abutment member.

6. The power battery top cap structure according to claim 5, wherein the assistant abutment member is integrated with at least one of the top cap piece or the lower insulation member.

7. The power battery top cap structure according to claim 1, wherein the lower insulation member forms an arch structure towards a direction away from the top cap piece along the Z axis when the abutment member abuts between the connecting portion and the top cap piece.

8. The power battery top cap structure according to claim 1, wherein the abutment member is integrated with at least one of the top cap piece or the lower insulation member.

9. The power battery top cap structure according to claim 1, wherein the first electrode assembly further comprises a first electrode column seal ring, and the second electrode assembly further comprises a second electrode column seal ring, wherein both the first electrode column and the second electrode column pass through the top cap piece along the Z axis, the first electrode column is fixed on the top cap piece in a sealed and insulated manner via the first electrode column seal ring, and the second electrode column is fixed on the top cap piece in a sealed and insulated manner via the second electrode column seal ring, and wherein one of the snapping portions snap fits with the first electrode column seal ring, and the other of the snapping portions snap fits with the second electrode column seal ring.

10. The power battery top cap structure according to claim 1, wherein the insulation end plate comprises a first receiving chamber and a second receiving chamber on two ends of the insulation end plate along the X axis, and electrode lug avoidance grooves on a side portion of the insulation end plate along the X axis, wherein each of the first receiving chamber and the second receiving chamber has a top opening and forms a channel with the electrode lug avoidance grooves, wherein the avoidance holes are opposite the first receiving chamber and the second receiving chamber, wherein the avoidance holes and the electrode lug avoidance grooves are arranged in a staggered fashion along the X axis, and wherein the first switching piece is disposed in the first receiving chamber, and the second switching piece is disposed in the second receiving chamber.

11. The power battery top cap structure according to claim 10, further comprising an electrode lug stop portion, wherein a second explosion-proof through hole is in a central portion of the insulation end plate, and each of the first receiving chamber and the second receiving chamber has an opening structure on a side facing the second explosion-proof through hole, and wherein the electrode lug stop portion is disposed between the lower insulation member and the insulation end plate to surround the second explosion-proof through hole.

12. The power battery top cap structure according to claim 11, wherein a second ventilation gap is on the electrode lug stop portion.

13. The power battery top cap structure according to claim 11, wherein the electrode lug stop portion is integrated with the insulation end plate.

14. A power battery, comprising:
a battery core; and
a power battery top cap structure, wherein the battery core is connected to the power battery top cap structure, and wherein the power battery top cap structure comprises:
a top cap piece, a length, a width, and a thickness of the top cap piece extending on an X axis, a Y axis, and a Z axis, respectively, where the X axis, the Y axis, and the Z axis are perpendicular to each other;
a first electrode assembly and a second electrode assembly fixed on the top cap piece, wherein the first electrode assembly comprises a first electrode column, and the second electrode assembly comprises a second electrode column;
a lower insulation member fixed below the top cap piece by a snap fit, a length, a width, and a thickness of the lower insulation member extending on the X axis, the Y axis, and the Z axis, respectively, wherein the lower insulation member comprises, along the X axis, a snapping portion arranged on each of two ends thereof, and a connecting portion arranged between the two snapping portions;
an abutment member extending along the Y axis and abutting between the connecting portion and the top cap piece, a minimum distance between the connecting portion and the top cap piece along the Z axis being G3, where G3>0; and
a first switching piece, a second switching piece, and an insulation end plate, wherein the insulation end plate is fixed below the lower insulation member, both the first switching piece and the second switching piece are arranged between the insulation end plate and the lower insulation member, wherein each of the snapping portions comprises an avoidance hole, and wherein the first electrode column passes through one of the avoidance holes of the lower insulation member and is connected with the first switching piece, and the second electrode column passes through the other of the avoidance holes of the lower insulation member and is connected with the second switching piece.

15. The power battery according to claim 14, wherein G3>0.5 mm.

16. The power battery according to claim 14, wherein a thickness of the abutment member along the Z axis is G2, wherein 0.5 mm<G2<30 mm, and wherein G3 is approximately equal to G2.

17. The power battery according to claim 14, wherein a first explosion-proof through hole is in a central portion of the connecting portion, and the abutment member includes an explosion-proof channel towards the first explosion-proof through hole along the X axis.

18. The power battery according to claim 14, wherein the lower insulation member forms an arch structure towards a direction away from the top cap piece along the Z axis when the abutment member abuts between the connecting portion and the top cap piece.

19. The power battery according to claim 14, wherein the abutment member is integrated with at least one of the top cap piece or the lower insulation member.

* * * * *